(12) United States Patent
van der Meijden et al.

(10) Patent No.: US 12,215,286 B2
(45) Date of Patent: Feb. 4, 2025

(54) REACTOR FOR THE HYDROTHERMAL TREATMENT OF BIOMASS

(71) Applicant: Nederlandse Organisatie voor toegepast-natuurwetenschappelijk Onderzoek TNO, The Hague (NL)

(72) Inventors: Christiaan Martinus van der Meijden, The Hague (NL); Jan Remmert Pels, The Hague (NL)

(73) Assignee: Nederlandse Organisatie voor toegepast-natuurwetenschappelijk Onderzoek TNO, The Hague (NL)

( * ) Notice: Subject to any disclaimer, the term of this patent is extended or adjusted under 35 U.S.C. 154(b) by 410 days.

(21) Appl. No.: 17/636,382

(22) PCT Filed: Aug. 20, 2020

(86) PCT No.: PCT/EP2020/073342
§ 371 (c)(1),
(2) Date: Feb. 18, 2022

(87) PCT Pub. No.: WO2021/032842
PCT Pub. Date: Feb. 25, 2021

(65) Prior Publication Data
US 2022/0267687 A1 Aug. 25, 2022

(30) Foreign Application Priority Data

Aug. 21, 2019 (EP) .................... 19192881

(51) Int. Cl.
*C10J 3/82* (2006.01)
*B01J 4/00* (2006.01)
(Continued)

(52) U.S. Cl.
CPC ............. *C10J 3/82* (2013.01); *B01J 4/007* (2013.01); *B01J 19/0013* (2013.01);
(Continued)

(58) Field of Classification Search
CPC .. C10J 3/82; C10J 2200/36; C10J 2300/0916; C10J 2300/0923; B01J 4/007;
(Continued)

(56) References Cited

U.S. PATENT DOCUMENTS 4,586,442 A * 5/1986 Caughey .................... C10J 3/20
48/209
5,510,393 A 4/1996 Coffman
(Continued)

FOREIGN PATENT DOCUMENTS

CN 104593090 A * 5/2015 ........ C10J 2300/091
CN 108728171 A * 11/2018 ........ C10J 2300/091
(Continued)

*Primary Examiner* — Kaity V Chandler
(74) *Attorney, Agent, or Firm* — N.V. Nederlandsch Octrooibureau

(57) ABSTRACT

The disclosure concerns a reactor and a process for the hydrothermal treatment of an aqueous mixture, such as watery biomass. The reactor has an inlet for receiving the aqueous mixture, a tube-shaped reactor interior, which is inclined at an angle in the range of 1-45°; a first zone in the reactor interior with means for heating the aqueous mixture; a second zone in the reactor interior for keeping the aqueous mixture at the predetermined temperature; a third zone in the reactor interior for cooling the aqueous mixture; an outlet for discharging a hydrothermally treated aqueous mixture, and an outlet for discharging gas. The inlet and outlet for discharging gas are positioned at the top part of the reactor and the outlet for discharging aqueous mixture is at the bottom part of the reactor. The inclined nature of the reactor ensures that all gases are efficiently removed from the liquid effluent, and the $CO_2$ formed during the process is used to improved efficacy of the hydrothermal treatment.

20 Claims, 1 Drawing Sheet

(51) Int. Cl.
  *B01J 19/00*  (2006.01)
  *B01J 19/24*  (2006.01)
(52) U.S. Cl.
  CPC ...... *B01J 19/2415* (2013.01); *B01J 2204/005* (2013.01); *B01J 2219/00076* (2013.01); *B01J 2219/00182* (2013.01); *B01J 2219/187* (2013.01); *C10J 2200/36* (2013.01); *C10J 2300/0916* (2013.01); *C10J 2300/0923* (2013.01)
(58) Field of Classification Search
  CPC ................ B01J 19/0013; B01J 19/2415; B01J 2204/005; B01J 2219/00076; B01J 2219/00182; B01J 2219/187; B01J 19/241; B01J 2219/00765
  See application file for complete search history.

(56) References Cited

U.S. PATENT DOCUMENTS

| | | | |
|---|---|---|---|
| 8,648,209 | B1 | 2/2014 | Lastella |
| 2012/0103040 | A1 | 5/2012 | Wolf et al. |
| 2012/0134888 | A1* | 5/2012 | Blevins ................. B01J 19/242 422/162 |
| 2013/0228445 | A1* | 9/2013 | Tsangaris ................. C10J 3/002 201/32 |
| 2014/0238681 | A1* | 8/2014 | Trygstad ................. C10G 9/36 422/111 |
| 2020/0070114 | A1* | 3/2020 | Liu ........................ B01J 19/249 |
| 2021/0276058 | A1* | 9/2021 | Ruiz .................... B01J 19/0026 |

FOREIGN PATENT DOCUMENTS

| | | | | |
|---|---|---|---|---|
| CN | 109401789 | A | * 3/2019 | ............... C01B 3/02 |
| FR | 2814967 | A1 | * 4/2002 | ............... A62D 3/20 |
| IE | 922120 | A1 | * 12/1992 | .......... B01J 19/2415 |
| KR | 20120024838 | A | * 3/2012 | .......... B01J 19/2415 |
| WO | 2005056723 | A1 | 6/2005 | |
| WO | 2009009038 | A1 | 1/2009 | |
| WO | WO-2012110012 | A1 | * 8/2012 | ............. C10B 39/08 |
| WO | 2013162355 | A1 | 10/2013 | |
| WO | WO-2016193460 | A1 | * 12/2016 | .......... B01F 3/04503 |

* cited by examiner

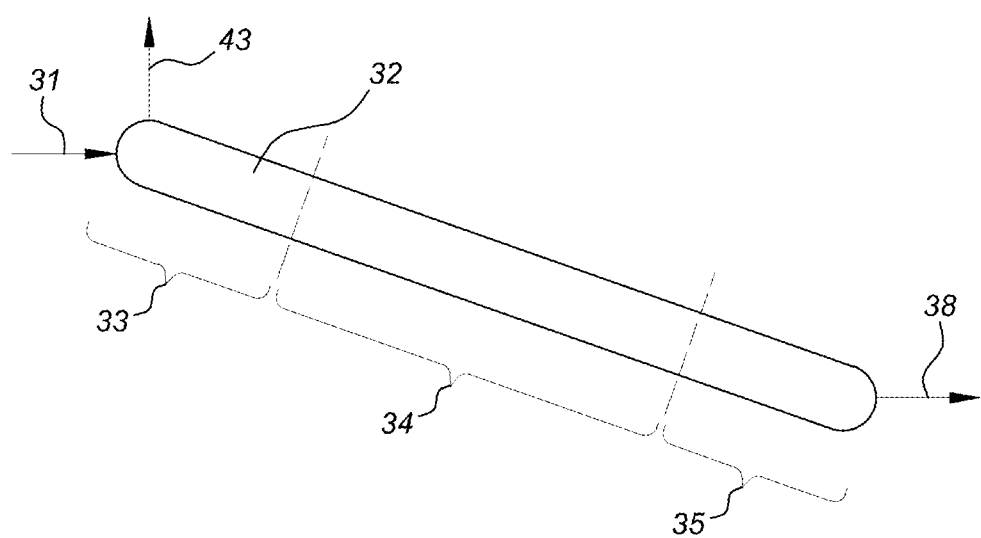

REACTOR FOR THE HYDROTHERMAL TREATMENT OF BIOMASS

FIELD OF THE INVENTION

The present invention relates to a reactor and a process for the hydrothermal treatment of an aqueous mixture.

BACKGROUND ART

Torrefaction is a useful process for converting inexpensive low value biomass such as agricultural wastes and the like into high-grade fuels. In a torrefaction process, the biomass is heated to moderately high temperatures, typically 200-320° C. without added oxygen, resulting in removal of most of the residual water and a gentle breakdown of constituents of biomass producing a gas fraction, the so-called "tor-gas", comprising water vapour, carbon dioxide and small organic molecules, and a compactable solid product, which can be processed into a solid fuel, e.g. as a coal substitute. As an example, WO 2005/056723 describes such a torrefaction process. In the art, pressurised torrefaction processes have been developed, wherein the water remains in the liquid state during the heat treatment (see e.g. NL 1029909, EP 2206688 and EP2206688). Such hydrothermal treatment leads to torrefaction of biomass and liberation of salts, which can be removed by mechanical means. WO 2010/112230 discloses a method for hydrothermally carbonising biomass involving a wet pressurised pretreatment at 90° C. and subsequent carbonisation at e.g. 190-220° C. and about 20 bar, followed by drying. The applicant has developed a hydrothermal torrefaction treatment, termed Torwash™, as described in WO 2013/162355.

In conventional hydrothermal treatment, such as Torwash, the tor-gases largely dissolve in the liquid stream and thus end-up in the liquid effluent. When dealing with waste streams, such as wastewater treatment sludge, these gases may contain significant amounts of pollutants such as H2S, which thus requires downstream treatment of the liquid effluent to remove such sulphur-containing gases.

The present invention provides in the need for a hydrothermal treatment wherein such gases are not accumulated in the liquid effluent, but instead in a concentrated gas stream, which avoids the need for downstream treatment of the liquid effluent. Furthermore, the hydrothermal treatment of the invention makes efficient use of the fact that this process is acid-catalysed, thus providing a more efficient treatment.

SUMMARY OF THE INVENTION

The inventors developed a reactor for performing hydrothermal treatment of an aqueous mixture, such as watery biomass. The invention concerns this reactor and a process for performing a hydrothermal treatment process within the reactor. The reactor according to the present invention is predominantly characterized by being inclined, and having an inlet at the top, a liquid outlet at the bottom and a gas outlet at the top, such that an open pathway exists for gases to flow to the gas outlet at the top. The inventors surprisingly found that performing the hydrothermal treatment process within the reactor first of all improved the efficacy of that treatment, since acidic carbon dioxide was efficiently dissolved in the aqueous mixture which catalyses the reactions of the hydrothermal treatment, and provides an improved aqueous effluent especially in terms of the content of sulphur-containing gases which are substantially absent from the effluent.

The invention preferably involves one of the following preferred embodiments:

1. A hydrothermal reactor, comprising:
   (31) an inlet for receiving an aqueous mixture, positioned at the top part of the reactor interior (32);
   (32) a tube-shaped reactor interior, which is inclined at an angle in the range of 1-45°;
   (33) a first zone in the reactor interior (32) comprising means (5) for heating the aqueous mixture to a predetermined temperature;
   (34) a second zone in the reactor interior (32) for keeping the aqueous mixture at the predetermined temperature;
   (35) a third zone in the reactor interior (32) for cooling the aqueous mixture;
   (38) an outlet for discharging a hydrothermally treated aqueous mixture, positioned at the bottom part of the reactor interior (32); and
   (43) an outlet for discharging gas, positioned at the top part of the reactor interior (32).
2. The reactor according to embodiment 1, wherein the inclination angle of the reactor interior is in the range of 2-15°.
3. The reactor according to embodiment 1 or 2, further comprising an expansion vessel (4) positioned at the top part of first zone (32), wherein the outlet (43) is integrated in the expansion vessel (4).
4. The reactor according to embodiment 3, wherein the expansion vessel (4) comprises a sensor (44) for determining the liquid level within the expansion vessel (4),
5. The reactor according to any one of the preceding embodiments, wherein the outlet (38) comprises a valve which can be opened and closed during operation.
6. The reactor according to any one of the preceding embodiments, wherein the reactor comprises a heat exchanger (5) for heating the aqueous mixture in the first zone (33) and for cooling the aqueous mixture in the third zone (35).
7. The reactor according to any one of the preceding embodiments, wherein the reactor is capable at operating at a predetermined temperature in the range of 160-320° C., preferably in the range of 175-230° C., and a pressure in the range of 10-50 bar, preferably in the range of 15-30 bar.
8. A hydrothermal treatment facility, comprising:
   (1) a buffer tank for holding an aqueous mixture that is to be treated
   (2) a pump for pumping an aqueous mixture from the buffer tank (1) to a reactor (3);
   (3) the reactor according to any one of embodiments 1-7; and
   (4) an expansion vessel positioned at the top part of the reactor (3), wherein the outlet (43) is integrated in the expansion vessel (4).
9. The hydrothermal treatment facility according to embodiment 8, further comprising a dewatering device (7) for dewatering the liquid effluent discharged via outlet (38), and preferably a digester (6) for digesting the aqueous mixture before it is subjected to the reactor (3) or after it has been dewatered in the dewatering device (7).
10. A process for hydrothermally treating an aqueous mixture in a reactor according to any one of embodiments 1-7 or in a facility according to embodiment 8 or 9, comprising:
    (a) feeding the aqueous mixture into the reactor interior (32) via inlet (31),
    (b) allowing a downward flow of the aqueous mixture through the reactor interior (32), while heating the aqueous mixture to a predetermined temperature in the first zone (33), keeping the aqueous mixture at the predetermined temperature in the second zone (34), and cooling the aqueous mixture in the third zone (35), as such hydrothermally treating the aqueous mixture;
(c) discharging a hydrothermally treated mixture via outlet (38),
(d) discharging gas via outlet (43).

11. The process according to embodiment 10, wherein the aqueous mixture is watery biomass, preferably selected from sludge, manure, dredging waste, food production waste and garden waste, most preferably wherein the sludge is obtained from a wastewater treatment process.

12. The process according to embodiment 10 or 11, wherein the gas that is discharged via a gas outlet (43) is further treated by a method for capture of $H_2S$ and other sulfurous compounds.

13. The process according to any one of embodiments 10-12, wherein the reactor operates in cycles, each cycle comprising while continuously feeding the aqueous mixture during step (a):
(1) a first stage wherein the outlet (48) is closed, no hydrothermally treated mixture is discharged, and the pressure within the reactor increases from an initial pressure to a final pressure,
(2) a second stage wherein the outlet (48) is open, hydrothermally treated mixture is discharged, and the pressure within the reactor decreases from the final pressure to the initial pressure.

14. The process according to embodiment 13, wherein the first stage lasts 70-99% of the cycle duration and the second stage lasts the remaining cycle duration, preferably wherein the cycle duration is in the range of 5 minutes-2 hours.

15. The process according to embodiment 13 or 14, wherein the initial pressure is in the range of 10-30 bar and the final pressure is in the range of 20-50 bar, wherein the initial pressure is higher than the final pressure, preferably at least 5 bar higher.

BRIEF DESCRIPTION OF DRAWINGS

The present invention will be discuessed in more detail below, with reference to the attached drawng(s), in which:

FIG. 1 shows an exemplary reactor according to the present disclosure.

DETAILED DESCRIPTION

The invention concerns a reactor for performing a hydrothermal treatment process and a method for performing a hydrothermal treatment process therein.
Reactor In a first aspect, the invention concerns a reactor for hydrothermal treatment, also referred to as a hydrothermal reactor. Within the reactor, an aqueous mixture, typically watery biomass, can be treated hydrothermally.

The reactor according to the invention comprises:
(31) an inlet for receiving an aqueous mixture, positioned at the top part of the reactor interior (32);
(32) a tube-shaped reactor interior, which is inclined at an average angle in the range of 1-45°;
(33) a first zone in the reactor interior (32) comprising means for heating the aqueous mixture to a predetermined temperature;
(34) a second zone in the reactor interior (32) for keeping the aqueous mixture at the predetermined temperature;
(35) a third zone in the reactor interior (32) for cooling the aqueous mixture;
(38) an outlet for discharging a hydrothermally treated aqueous mixture, positioned at the bottom part of the reactor interior (32); and
(43) an outlet for discharging gas, positioned at the top part of the reactor interior (32).

The reactor according to the invention is further described here below and is depicted in FIG. 1, wherein the key elements of the reactor are depicted. The reactor according to the invention comprises (31) an inlet for receiving the aqueous mixture, (32) a tube-shaped reactor interior, which is inclined at an angle in the range of 1-45°; (33) a first zone in the reactor interior (32) comprising means for heating the aqueous mixture; (34) a second zone in the reactor interior (32) for keeping the aqueous mixture at the predetermined temperature; (35) a third zone in the reactor interior (32) for cooling the aqueous mixture; (38) an outlet for discharging a hydrothermally treated aqueous mixture, and (43) an outlet for discharging gas, wherein inlet (31) and outlet (43) are positioned at the top part of the reactor and outlet (38) at the bottom part of the reactor.

The reactor according to the invention has an elongated interior (32), typically in the form of a tube, which is positioned in an inclined plane. Thus, one end of the reactor interior is positioned above the other end of the reactor interior. The inlet (31) is positioned at the top part of the reactor interior (32), i.e. at the end that is positioned highest. The outlet (38) is positioned at the bottom part of the reactor, i.e. at the end that is positioned lowest. The aqueous mixture to be treated is thus fed at the top end of the reactor and the treated aqueous effluent is discharged from the bottom.

Inlet (31) is for receiving the aqueous mixture to be treated. When the aqueous mixture is received in the reactor interior, it will flow through the tube downward toward the outlet (38). Although it is preferred that that inclination angle at which the tube-shaped reactor is position is constant over the entire reactor length, some deviation from the average inclination angle is possible without jeopardizing the working of the reactor according to the invention. For example, a deviation up to 10°, preferably up to 5°, more preferably up to 2°, most preferably the inclination angle is constant over the entire length of the reactor. Although some deviation is allowed, the angle should typically not be such that the aqueous mixture flows horizontally or up. Over the entire length of the reactor interior, a slight downward inclination should be present.

The average inclination angle of the reactor is in the range of 1-45°, preferably 2-15°. The inventors found that with such inclination angles, the gas bubbles formed within the reactor efficiently move upward towards the top part, and the aqueous mixture is able to flow downward without problems. In case the angle would be greater, gas will flow instantaneously to the top part of the reactor, disabling contact between the gas phase and liquid phase within the reactor. Sufficient contact between the two phases is required to enable exchange of compounds. Smaller angles were found to disable the gas flow within the reactor to the top part. The inclination angle is preferably chosen such that gas bubbles do not move upward more slowly than the aqueous mixture moves downward, such that there is a net upward movement of the bubbles. Optimal results have been obtained with an average inclination angel in the range of 5-10°. In a preferred embodiment, the average inclination angle defined herein is the inclination angle, which indicates that the inclination angle is substantially constant over the entire length of the reactor.

The reactor interior being "tube-shaped" indicates that the inside wall of the reactor is free from any obstacles that may hinder the flow of gas upward. The inventors found however that the presence of baffles gave an improved efficacy of the reactor. Without being bound to a theory, it is believed that the baffles ensure proper mixing of the liquid stream such that efficient heat transfer from the wall to the entire aqueous mixture is achieved. The presence of baffles was particularly effective when placed in the first zone and the third zone. Thus, in one embodiment, the reactor interior comprises baffles, preferably at least in the first zone and/or in the third zone, most preferably at least in the first and third zone. During heating and cooling, the presence of baffles gave particularly improved efficacy of the hydrothermal treatment, in particular in terms of the heat transfer. In case the reactor interior contains baffles, it is preferred that the gas flow remains free of obstacles. Thus, gas bubbles will move along and just beneath the upper wall of the reactor to accumulate at the top part. It is preferred that any baffle that may block this path along the upper wall contains a hole at the upper side of the baffle, to allow free passage of the gas bubbles. As such, the inventors have found a way to employ baffles to increase the efficacy of the hydrothermal treatment and at the same time not to jeopardise the gas flow that is essential for the working of the present invention, and again improving the efficacy of the hydrothermal treatment.

The tube may have any trajectory downward from the top part of the reactor to the bottom part of the reactor, such as linearly or it may contain bends or turns, as in a zigzag or spiral form. As long as the inclination angle is respected, the trajectory may take any form. Further, the length of the tube-shaped reactor interior is preferably 10-1000 times larger than the diameter thereof, preferably 100-500 times larger, most preferably 500-250 times larger. An exemplary reactor interior may be 1-2000 meters in length, preferably 5-100 meters, and 1 cm-5 meters in diameter, preferably 5 cm-50 centimetres. Such long reactors, with lengths surpassing even 1 km, are known in the art, e.g. from Lysotherm, and are highly efficient in transferring heat to the reactor interior and avoiding hotspots.

The reactor interior is divided into three consecutive zones. In a first zone (33), directly downstream of the inlet (31), the aqueous mixture is heated to a predetermined temperature. The first zone (33) comprises heating means that are capable of hearing the aqueous mixture to the predetermined temperature. These heating means may take any form known in the art to be suitable. In a preferred embodiment, the heating means take the form of a heat exchanger.

The second zone (34) is located directly downstream of the first zone. In the second zone, the aqueous mixture that has been heated to the predetermined temperature in the first zone is kept at the predetermined temperature. In one embodiment, the second zone (34) comprises means to keep the aqueous mixture at the predetermined temperature. Such means may take the form of heating means which are capable of providing sufficient heat to the aqueous mixture to maintain the elevated predetermined temperature or in the form of thermal isolation that prevents substantial cooling of the aqueous mixture. Preferably, a low capacity heating means in installed in the second zone (34).

The third zone (35) is located directly downstream of the second zone. In the third zone (35), the reaction mixture is allowed to cool down from the predetermined temperature. Although active cooling means may be installed, those are not required and the mixture can slowly be cooled passively. In a preferred embodiment, the heat that is released from the cooling of the aqueous mixture in the third zone is used to heat the aqueous mixture in the first zone. Thus, in a preferred embodiment, the reactor according to the invention comprises a heat exchanger for heating the aqueous mixture in the first zone (33) and for cooling the aqueous mixture in the third zone (35). Herein, the first zone and the third zone are in thermic contact. In view of the configuration of the reactor, the heat is preferably transferred from the third zone to the first zone via a medium, such as a thermal oil.

At the bottom part of the third zone, outlet (38) is provided. The reactor can be operated with a continuous discharge from outlet (38). However, it is preferred that the outlet (38) is equipped with a valve which can be closed and opened during operation. When the aqueous mixture is continuously fed into the reactor and the outlet (38) valve is in closed position, pressure will build up in the reactor. When the outlet (38) valve is opened, pressure is released and aqueous effluent will be rapidly discharged from the reactor. As such, discharge cycles can be implemented, wherein the feed is continuous and the discharge is pulsed (alternating closed and open position of outlet (38) valve). As will be described in more detail in the process section below, this has a positive effect on the heat and mass transfer within the reactor.

As any hydrothermal treatment reactor, it should be able to operate at elevated temperature and pressure. The predetermined temperature refers to the reaction temperature at which the hydrothermal treatment takes place. Preferably, the predetermined temperature is in the range of 160-320° C., more preferably in the range of 175-250° C., more preferably in the range of 180-210° C. The pressure within the reactor is typically in the range of 10-50 bar, preferably in the range of 15-30 bar. These conditions were found to be optimal for treating the aqueous mixture in terms of dewaterability of the treated liquid effluent. Nonetheless, the exact pressure values are not crucial to the invention, as long as the pressure is higher than the partial pressure of steam at the operating temperature of the reactor. As such, no bubble will be formed because of boiling water.

The reactor further comprises an outlet (43) for discharging gas that is formed during the hydrothermal treatment process. Gas is formed throughout the entire length of the reactor tube, except possibly for the bottom part of the third zone where the temperature may be too low for gas to be formed. Due to the inclined nature of the tube-shaped reactor interior, gases will move up through the reactor to the top part. There, an outlet (43) is provided for discharging the gases from the reactor, to prevent unwanted build-up of gases within the reactor.

In a preferred embodiment, the reactor contains an expansion vessel at the top part of the reactor interior. Herein, the outlet (43) is integrated in the expansion vessel. The gases will accumulate in the expansion vessel, which is preferably equipped with a sensor for determining the liquid level within the expansion vessel. As gases accumulated, the pressure in the reactor increases and the liquid level in the expansion vessel will rise. The release of gases via outlet (43) can be controlled be monitoring the liquid level in the expansion vessel. The control the operation of the release valve (43), the expansion vessel is preferably equipped with a sensor for determining the liquid level and/or a manometer.

The expansion vessel may be connected to the tube-shaped interior of the reactor via a tee having two legs protruding in horizontal or close to horizontal position, that are part of the rube-shaped interior, and an upward protruding leg to which the expansion vessel is connected.

The reactor typically comprises a pump for pumping the aqueous mixture to the inlet (31) of the reactor. Any pump known in the art can be used, such as a displacement pump.

During operation, the aqueous mixture is present in the reactor, together with gases that are released from during processing. These gases form bubbles within the reactor. The composition of the gas bubbles may vary depending on the exact composition of the aqueous mixture, but the gas bubbles are typically mainly composed of $CO_2$ and minor amounts of other gases such as $H_2S$. The gas bubbles rise to the top of the tube-shaped reactor interior (32) and, because of the incline, flows upwards in counter-current mode with respect to the direction of the flow of the aqueous mixture. Eventually, the gases accumulate at the top and typically flow into the expansion vessel.

The top part of the reactor, such as the expansion vessel, is partly filled with aqueous mixture and partly with gases that have accumulated over time. Preferably, level indicators and manometers are present. Located at the top part of the reactor interior, typically at the top of the expansion vessel, is a valve (43) that allows the release of gas. The gas is released occasionally when the level of the aqueous mixture in the expansion vessel is too low. During start-up of the reactor, the gas at the top of the reactor interior is predominantly air, but over time it is replaced by the gases that are formed in the reactor.

The aqueous mixture is fed to the pressurized reaction zone. In case the release valve (38) is closed, the pressure in the system gradually increases. The gases in the expansion vessel are compressed and the level of the aqueous mixture rises. When a predetermined maximum pressure is reached, the release valve (38) at the end of the reactor may be opened. As a result processed aqueous mixture is discharged, the level of the aqueous mixture lowers, the gases expand and the pressure lowers. When a predetermined minimum pressure is reached, the release valve (38) may be closed and the discharge cycle is repeated. When, after the release valve (38) has closed again (i.e. at minimum pressure), the level of the aqueous mixture is below a certain threshold value, gases may be released through valve (43). Typically, it is not required to release gases after every discharge cycle, as long as the reactor is operated within safety boundaries.

The gas that is formed in the reactor and released from valve (43) is mainly $CO_2$, but it typically contains a few percent of $H_2S$. Trace amounts of CO and other gases may be present. The exact composition depends on the pressure in the reactor and the local temperature. When the pressure increases, i.e. when valve (38) is closed, these gases condense and dissolve partly into the aqueous mixture. When the pressure is released, i.e. when valve (38) is opened, dissolved gases such as $CO_2$, $H_2S$ and $H_2O$, are released from solution and form new bubbles. The bubbles form simultaneously at many places within the reactor, and move upwards. The movement of the bubbles stirs the aqueous mixture, which improves heat and mass transport during the hydrothermal treatment within the reactor.

Bubbles exist in the first zone (33), because they flow upwards from the second zone (34). In the second zone (34), and possibly to some extent in the first and third zone (33, 35), bubbles are formed as a result of the hydrothermal decomposition of the aqueous mixture, which typically yields $CO_2$ and $H_2S$. These gases are formed mainly during the period when valve (38) is closed, and because of the pressure rising they remain largely dissolved. When the pressure is released, there is an oversaturation in the solution, and gas bubbles are formed. Gaseous $H_2O$ is typically also present within the bubbles, because the partial pressure of $H_2O$ equals the vapour pressure of water at the local temperature. Thus, anywhere in the reactor, the bubbles have a partial water vapour pressure corresponding to the local temperature. The remainder of the gas within the bubble is typically $CO_2$, $H_2S$ and possible traces of other gases. At the top part of the reactor interior, i.e. near the inlet (31) and in the expansion vessel, at ambient temperature, the water vapour pressure in the gas is low (ca. 0.1 bar). The $CO_2$ pressure is determined by the temperature and the pH of the aqueous mixture. In the second zone (34), where the temperature is highest, the vapour pressure of water is typically about 15 bar. At a total pressure of e.g. 25 bar, the other gases, mainly $CO_2$, can amount up to 10 bar. Rapidly lowering the total pressure to (for example to 20 bar) shifts this equilibrium: Existing bubbles expand, while dissolved $CO_2$ forms new bubbles. Due to evaporation of water, the new bubbles will contain $CO_2$, $H_2O$, etc. that responds to changes in total pressure at a more or less uniform temperature. The bubbles flow upward through the interior of the reactor (32). Bubbles that flow from the second zone (34) to the first zone (33) move into a cooler environment. At the top part of the reactor, the temperature is at ambient temperature, where the water vapour pressure is lower. While moving upwards through the first zone (33), water in the bubbles condenses and the partial pressure of $H_2O$ lowers. Since the total pressure remains the same, the volume fraction of $CO_2$ (and other gases) increases. As a result the bubble shrink, but do not disappear. Simultaneously, while the temperature of the bubbles gradually lowers, the solubility of $CO_2$ in water increases. This results in an increasing part of the gaseous $CO_2$ going into solution. Consequently, even more water condenses. When flowing towards the inlet and cooling down, bubbles get smaller. However, not all gas disappears as a result of condensation of water and dissolution of $CO_2$. Small bubbles, composed largely of $CO_2$ reach the expansion vessel (23) where gases accumulate In the reactor, mainly in the first zone (33), $CO_2$ dissolves from the gas phase (in upwards moving bubbles) into the aqueous mixture of aqueous mixture, due to the combined effects of increasing partial pressure and increasing solubility of $CO_2$ in water at lower temperatures. The dissolved $CO_2$ content of the incoming aqueous mixture is increased. The increases in temperature because of the heating in the first zone results in saturation or oversaturated in $CO_2$. The increase in pressure helps to keep the $CO_2$ dissolved. However, opening of the release valve (38) gives a pressure drop, which generates many new CO2 bubbles. As such, a good interaction between the gas phase and the aqueous mixture and saturation with $CO_2$ is ensured. The dissolved $CO_2$ lowers the pH of the aqueous mixture. $H^+$ ions coming from dissolved $CO_2$ may be buffered by salts such as phosphates that may be present in the aqueous mixture, but more and more $CO_2$ will be dissolved, eventually leading to a pH that is the result of the equilibrium that is established between the dissolved $CO_2$ and the gaseous $CO_2$ in the bubbles. Since the decomposition reactions of hydrothermal treatments, such as Torwash, are acid-catalysed, the efficacy of the reactor is improved with the design according to the invention. The reactions start at a temperature that is lower than the reaction temperature in the second zone (34) and take place already before the operational temperature (the predetermined temperature in the second zone (34)) is reached, generating $CO_2$. At the operational temperature, acid-catalysis may no longer be needed, but the acidification due to dissolved $CO_2$ still leads to an increased reaction rate. As a result, the reactor can be much smaller, residence times shorter and/or operation temperature can be reduced.

The solubility of $CO_2$ and $H_2S$ is lowest at the highest temperature, i.e. the setpoint temperature in the second zone (34). Since $CO_2$ and $H_2S$ are continuously removed from the aqueous mixture that is being treated, by means of upwards flowing bubbles, and since the partial pressure of $CO_2$ and $H_2S$ is rather low (total pressure minus water vapour pressure), there is at the end of the isothermal zone (bottom of the second zone (34)) hardly any $CO_2$ and $H_2S$ left. The dissolved concentration is low. After cooling in the third zone (35), the aqueous mixture is far from saturated with $CO_2$ and $H_2S$. In the release valve (38), no gas is formed, even when the pressure would be lowered from 25 to 1 bar. The processed aqueous mixture discharged from the reactor contains hardly any $CO_2$ and $H_2S$. In the reactor, the sulphur-containing gases are effectively removed from the aqueous mixture before it enters the third zone (35) and accumulate in the expansion vessel. The smell of the aqueous mixture processed according to the present invention is much better than aqueous mixture hydrothermally treated by conventional means, also because it is sterilized and bacterial activity emitting $H_2S$ is absent. The gas released from the expansion vessel (4) via outlet (43) has a terribly smell. All sulphur-containing gases have accumulated in this small stream, which can be post-treated as known in the art.

The reactor of the present invention provides a hydrothermal treatment process that outperforms conventional hydrothermal treatment processes. The specific reactor design with an include tube-shaped interior, provides a marked improvement. The inventors have found a way to utilize the gases that are formed by the hydrothermal treatment process to create an acidic environment, but avoiding entrapment of the gases within the reactor. In fact, the gases have sufficient contact time with the liquid phase to achieve complete dissolution thereof into the liquid, which creates an acidic environment, but at the same time the gases are allowed to accumulate at the top of the reactor, where they can be discharged. This further ensures that the gases are completely removed from the aqueous effluent, as they move up while the liquid phase moves down. The gaseous fraction typically contains carbon dioxide, and may further contain sulphur-containing gases such as hydrogen sulphide, COS and $CS_2$.

A second aspect of the invention is a hydrothermal treatment facility, comprising (1) a buffer tank for holding an aqueous mixture that is to be treated; (2) a pump for pumping an aqueous mixture from the buffer tank (1) to a reactor (3); (3) the reactor according to the invention; and (4) an expansion vessel positioned at the top part of the reactor (3), wherein the outlet (43) is integrated in the expansion vessel (4). Such a hydrothermal treatment facility may be a stand-alone facility or may be part of a larger facility, such as a wastewater treatment plant, wherein the hydrothermal treatment facility according to the invention can be implemented in the sludge handling line.

The aqueous mixture, in particular when originating from a wastewater treatment plant, may be subjected to a dewatering step (7) for dewatering the liquid effluent discharged via outlet (38). Such a dewatering step is often performed in the context of a wastewater treatment facility, wherein the liquid effluent (e.g. centrate or filter water) is subjected to the wastewater treatment and the solid effluent (e.g. cake) may be fed to an incinerator. The facility thus preferably contains a dewatering device located downstream of the reactor. In the context of this embodiment, the dewatering device is typically a centrifuge, but other dewatering devices such as a belt press and a gravity belt are also suitable.

The facility further preferably compress a digester (6) for digesting the aqueous mixture before it is subjected to the reactor (3) or after it has been dewatered in the dewatering device (7). Preferably, the digester is located downstream of the reactor (3). Such a digestion step affords biogas, which may be converted into bio-SNG. The aqueous effluent of the digester is subjected to the reactor or is recycled to the wastewater treatment steps.

In an especially preferred embodiment, the hydrothermal treatment facility is a sludge handling line, further comprising a dewatering device for dewatering the aqueous effluent that has been subjected to the hydrothermal treatment step, which affords a solid stream that contains most of the solids obtained by the hydrothermal treatment and a liquid effluent with a greatly diminished solid content, and a digester for digesting the solid stream originating from the dewatering device. In such a sludge handling line, the liquid effluent originating from the dewatering device is typically reintroduced in the wastewater treatment process in order to remove any remaining pollutants.

The reactor according to the invention is ideally suited to be implemented into such a treatment facility, especially in combination with a dewatering device. The inventors have found that the inclined nature of the reactor provides unprecedented results of the hydrothermal treatment process. One of these results is an optimal dewaterability of the aqueous effluent. Dewatering of the aqueous effluent is thus performed with greater efficacy and improved results (greater solid content in the solid stream and lower solid content in the liquid stream), compared to the dewatering of conventional hydrothermally treated effluents.

Process

In a third aspect, the invention concerns a process for hydrothermally treating an aqueous mixture. The process according to the invention is performed in the reactor according to the invention. The process according to the invention comprises:

(a) feeding the aqueous mixture into the reactor interior (32) via inlet (31),
(b) allowing a downward flow of the aqueous mixture through the reactor interior (32), while heating the aqueous mixture to a predetermined temperature in the first zone (33), keeping the aqueous mixture at the predetermined temperature in the second zone (34), and cooling the aqueous mixture in the third zone (35), as such hydrothermally treating the aqueous mixture;
(c) discharging a hydrothermally treated mixture via outlet (38),
(d) discharging gas via outlet (43).

In step (a), the aqueous mixture is fed to the interior of the reactor via inlet (31). Any type of aqueous mixture that is suitable to be hydrothermally treated may be subjected to the process according to the invention. The aqueous mixture should contain organic material, part of the carbon atoms therein will be converted into carbon dioxide. Preferably, the content of organic material is in the range of 0.1-15 wt %, more preferably 1-10 wt %, most preferably 3-8 wt %. Although the process according to the invention is able to cope therewith, the amount of inorganic solids is preferably kept as low as possible, such as below 5 wt % or even below 1 wt %. Inorganic solids do not substantially contribute to the reactions of the hydrothermal treatment. In a preferred embodiment, the aqueous mixture is aqueous biomass or watery biomass, preferably selected from sludge, manure, dredging waste, food production waste and garden waste, most preferably wherein the sludge is obtained from a wastewater treatment process. The process according to the present invention is thus ideally suited as part of sludge handling line in wastewater treatment facilities.

The process can be operated at any solid loading of the aqueous mixture. Typically, the aqueous mixture has a total solid content of 1-15 wt %, preferably 3-8 wt %. The aqueous mixture typically contains organic compounds, such as proteins (e.g. proteins rich in methionine, which is a precursor for sulphur-containing odorous compounds in sewage sludge), carbohydrates (e.g. cellulose) and fats (e.g. grease).

The process according to the invention is particularly suited to deal with sulphur-containing gases being formed during the hydrothermal treatment, as these gases accumulated at the top and are discharged via outlet (43) as a separate and concentrated stream, and not end up in the liquid effluent discharged via outlet (38). The process according to the invention is thus ideally suited to cope with protein-containing aqueous mixtures and sulphate-containing aqueous mixtures, as those typically give rise to sulphur-containing gases during the hydrothermal treatment. Thus, in one embodiment, the sulphur content of the aqueous mixture is 1-1000 mg, preferably 10-250 mg, more preferably 50-100 mg per kg of the aqueous mixture. Alternatively, the sulphur content is preferably in the range of 2000-30000 ppm, more preferably in the range of 5000-20000 ppm, more preferably in the range of 8000-12000 ppm, based on dry weight of the aqueous mixture.

In step (b), the aqueous mixture flows downward through the reactor interior (32), during which it consecutively passes through the first zone (33), the second zone (34) and the third zone (35). In this step, the aqueous mixture is hydrothermally treated, and affords a hydrothermally treated mixture is discharged via outlet (38).

When the aqueous mixture passes through the first zone, it is heated to a predetermined temperature. The predetermined temperature refers to the reaction temperature at which the hydrothermal treatment takes place. Preferably, the predetermined temperature is in the range of 160-320° C., more preferably in the range of 175-250° C., more preferably in the range of 180-210° C. When the aqueous mixture passes through the second zone, it is kept at the predetermined temperature. Herein, some (local) variation in the temperature is allowed. Preferably, the temperature is kept within 25° C. of the predetermined temperature, preferably within 10° C. or even within 2° C. of the predetermined temperature. This is especially relevant for temperature variations below the predetermined temperature. Variation above the predetermined temperature is less detrimental for the overall efficacy of the process. In a preferred embodiment, carbonisation is avoided. Preferably, the temperature does not exceed 260° C., more preferably 230° C., as at such temperatures cokes may form that foul the reactor interior. In the third zone, the aqueous mixture is allowed to cool from the predetermined temperature to a lower temperature. The end temperature at the bottom of the third zone (35) may be in the range of 10-60° C., preferably 20-55° C., most preferably 40-50° C. Such a final temperature is ideally suitable in the process according to the present invention, as it allows smooth addition of the aqueous effluent, preferably after a dewatering step, to be added to the digester at the right temperature to perform the digestion step, without any need for further heating or cooling.

The pressure within the reactor is typically in the range of 10-50 bar, preferably in the range of 15-30 bar. These conditions were found to be optimal for treating the aqueous mixture in terms of dewaterability of the treated liquid effluent. Nonetheless, the exact pressure values are not crucial to the invention, as long as the pressure is higher than the partial pressure of steam at the operating temperature of the reactor. As such, no bubble will be formed because of boiling water.

At the end of step (b), the treated aqueous mixture is discharged from the reactor. Gases that accumulate during the hydrothermal treatment are released from the reactor in step (c). The skilled person understands at which rate gases need to be released to ensure safe operation of the reactor The process according to the invention is ideally suited to be operated continuously. Aqueous mixture is continuously fed via in let (31) to the reactor, and is then heating in the first zone, kept at the reaction temperature in the second zone and cooled in the third zone. The discharge of the treated aqueous mixture may be batch-wise or continuous. In a preferred embodiment, the discharge of the treated aqueous mixture is batch-wise as described here below.

For continuous discharge, outlet (38) is in open position all the time and treated aqueous mixture emerges from the reactor continuously. In a preferred embodiment, the discharge is batch-wise or step-wise. This is also referred to as "pulsed discharge". Herein, the outlet (38) contains a valve, which switches between an open position and a closed position. In the closed position, aqueous mixture continues to be fed into the reactor and the pressure increases. When the valve switches to the open position, treated aqueous mixture is forcefully expelled from the outlet in view of the pressure difference between the reactor interior after pressure has been built up and the downstream piping. The inventors found that a pulsed discharge performed optimally when the valve of outlet (38) was in closed position for 80-99% of the time, preferably 90-98% of the time, most preferably 95-97% of the time. During such a pulsed discharge, the pressure within the reactor drops rapidly, typically by about 2-15 bar, preferably 3-10 bar, which causes dissolved gases (mainly $CO_2$) to transfer from solution into the gas phase. In other words, a sudden burst of bubbles appears. The sudden appearance of the bubbles provides optimal mixing of the aqueous mixture being treated and ensures efficient heat management within the reactor. As such, the efficacy of the process was further improved. Additionally, the pulsed discharge facilitates the movement of the gas bubbles towards the gas outlet at the top of the reactor. When the discharge valve is in closed position, the aqueous mixture within the reactor is largely stagnant, and the gas flow is not hampered by a liquid flow in the opposite direction.

The process according to the invention is preferably operated such that the residence of the aqueous mixture time within the reactor is 10-600 min, preferably 30-300 min, most preferably 45-120 min. The feed flux may be in the range of 5-250 L per hour, preferably 15-100 L per hour, most preferably 25-50 L per hour. The flux of the aqueous mixture throughout the reactor interior is preferably constant, such that the pressure over the entire length of the tube is more or less equal.

The process according to the invention may be part of a sludge handling process, for the treatment of sewage sludge or sludge obtained from a wastewater treatment process.

Example

A pilot hydrothermal treatment system was installed. The system is a pulsed reactor containing a displacement pump (eccentric screw pump with a variable frequency controlled by a flow meter) that fed 25-50 litre sludge per hour into the pressurized zone. The sludge can have any solids content, but the system was operated with sewage sludge having a dry matter content of 3-8 wt %.

The sludge was pumped horizontally to a tee, having a second horizontal connection and one vertical upwards. The inlet from the pump is connected to one of the horizontal connections and the second horizontal connection is connected to the sole inlet of the reactor. The vertical connection of the tee is connected to an expansion vessel.

The reactor is composed of a tube that is split into four sections of equal length, 2 meters each. The sections are connected by 180° bends. All sections are positioned with an incline of 5° so that the inlet is higher than the outlet. The tube, including the bends, has an inner diameter of 8 mm. The residence time of the sludge in each section is about 15 minutes. The first section, is used for heating of the sludge from ambient temperature to the setpoint temperature of the reactor, which is typically about 180-210° C. The pilot system employed electric heaters, but any suitable heater could be used, including thermal oil. In the second and third section, the sludge is kept at the setpoint temperature. The tubes are thermally insulated to compensate for heat losses to the environment. The sludge remains for about 30 minutes in these two sections. In the fourth section, the sludge is cooled to 40-50° C. The pilot system employed cold tap water, but any cooling medium can be used. In the pressurized zone the sludge flow is typically slow, such that the pressure is equally over the entire tube.

At the end of the pressured zone, there is an outlet valve that can be opened to discharge the processed sludge and to release pressure. This is the only outlet of the reactor system. The system was operated with the valve open permanently, to allow a continuous discharge flow. The system was also operated by keeping the valve closed most of the time, and open it for short time (about 3-4% of the total cycle time) to release processed sludge and pressure.

During operation, there is liquid sludge present in the reactor, together with gases that are released from the sludge during processing. These gases form bubbles within the reactor. The gas bubbles are mainly composed of $CO_2$, but depending on the exact composition of the sludge minor amounts of other gases such as $H_2S$ may be formed. The gas bubbles rise to the top of the reactor tube and, because of the incline, flows upwards in counter-current mode with respect to the direction of the sludge flow. Eventually, the gases accumulate at the top and flow into the expansion vessel.

During operation, the expansion vessel is partly filled with sludge and partly with gases that have accumulated over time. There are level indicators and manometers. At the top of the expansion vessel there is a valve that allows the release of gas. The gas is released occasionally when the sludge level in the expansion vessel is too low. During start-up of the reaction, the gas in the expansion vessel is predominantly air, but over time it is replaced by the gases that are emerging from the reactor.

The process system is preferably operated in cycles. The pump continuously pushed sludge into the pressurized zone, while the release valve is closed. When the release valve is closed, the pressure in the system gradually increases. The gases in the expansion vessel are compressed and the sludge level in the expansion vessel rises. When a predetermined maximum pressure is reached, the release valve at the end of the reactor is opened. As a result processed sludge is discharged, the sludge level in the expansion vessel lowers, the gases expand and the pressure lowers. When a predetermined minimum pressure is reached, the release valve closes and the cycle is repeated.

The system was operated with a maximum pressure of 25 bar and a minimum pressure of 20 bar, but the exact values are not crucial to the invention as long as they are both higher than the steam pressure of the operating temperature of the reactor. The typical duration of a cycle is about 6 minutes, with the release valve opened for about 5 seconds. The cycle time depends on the feed rate of the pump, the amount of gas accumulating in the expansion vessel and the predetermined minimum and maximum pressures. The time that the release valve is open depends mainly on the size of the opening in the valve and the predetermined minimum and maximum pressures.

When, at the end of the cycle and after the release valve has closed again (i.e. at minimum pressure), the sludge level in the expansion vessel is below a certain threshold value, gases are released from the top of the expansion vessel through valve. Depending on the amount of gases that is released, this may occur each cycle or after two or more cycles have completed. The gas that is formed in the reactor and release from valve is mainly $CO_2$, but it typically contains a few percent of $H_2S$. Trace amounts of CO and other gases may be present.

The pressure in the tube combined with the local temperature has an effect on the composition of the gas bubbles in the reactor. These bubbles are composed mainly of $H_2O$, $CO_2$ and some $H_2S$. With increasing pressure, i.e. when valve is closed), these gases condense and dissolve partly into the sludge. When the pressure is released, i.e. when valve is opened, dissolved $CO_2$ and $H_2S$ are released from solution and form new bubbles, while $H_2O$ is evaporated. The bubbles form simultaneously at many places within the sludge, and move upwards. The movement of the bubbles stirs the sludge, which improves heat and mass transport during the hydrothermal treatment.

The exact composition of the gas bubbles depends on temperature, pressure and also the pH of the sludge. Bubbles exist in the heating section, because they flow upwards from the middle sections. In these middle sections, bubbles are formed as a result of the hydrothermal decomposition of the sludge, which yields $CO_2$ and $H_2S$. These species are formed mainly during the period when valve is closed. Because in that period the pressure rising they remain largely dissolved. When the pressure is released, there is an oversaturation in the solution, and gas bubbles are formed.

In case the operating pressure is higher than the water vapour pressure, there are no bubbles as a result of boiling of the water. However, when gases are formed by means of gaseous $CO_2$ and $H_2S$, also gaseous $H_2O$ is present within the bubbles. The partial pressure of this $H_2O$ is the vapour pressure of water of the local temperature. Evaporation of $H_2O$ into these bubbles locally cools the sludge and avoids overheating. Anywhere in the reactor, the bubbles have a partial water vapour pressure corresponding to the local temperature. The rest of the gas in the bubble is $CO_2$, $H_2S$ and possible traces of other gases. The composition thus depends strongly on the local temperature. At the inlet and in the expansion vessel, i.e. at ambient temperature, the water vapour pressure in the gas is low (ca. 0.1 bar). The $CO_2$ pressure is determined by the temperature and the pH of the sludge. The gas in the expansion vessel was determined to contain 88 vol % $CO_2$, 0.15 vol % CO, 0.89 vol % $H_2S$ and 0.18 vol % methyl mercaptan on dry basis. The remainder of the gas was composed of air (mainly nitrogen gas).

In the middle sections, where the temperature is highest, typically 200° C., the vapour pressure of water is typically about 15 bar. At a total pressure of 25 bar, the other gases, mainly $CO_2$, can amount up to 10 bar. Rapidly lowering the total pressure to 20 bar shifts this equilibrium: Existing bubbles expand, while dissolved $CO_2$ forms new bubbles. Due to evaporation of water, the new bubbles will contain $CO_2$, $H_2O$, etc. that responds to changes in total pressure at a more or less uniform temperature. Bubbles flow upward through the interior of the reactor.

Bubbles that flow from the middle section to the first section move into a cooler environment. At the top of the reactor, the temperature is at ambient temperature, where the water vapour pressure is lower. While moving upwards through the first section, water in the bubbles condenses and the partial pressure of $H_2O$ lowers. Since the total pressure remains the same, the volume fraction of $CO_2$ (and other gases) increases. As a result the bubble shrink, but do not disappear. Simultaneously, while the temperature of the bubbles gradually lowers, the solubility of $CO_2$ in water increases. This results in an increasing part of the gaseous $CO_2$ going into solution. Consequently, even more water condenses. When flowing towards the inlet and cooling down, bubbles get smaller. However, not all gas disappears as a result of condensation of water and dissolution of $CO_2$. Small bubbles, composed largely of $CO_2$ reach the expansion vessel where gases accumulate. There is about 1 litre gas formed for each litre of sludge that is fed (at ambient conditions).

In the heating section, $CO_2$ dissolves from the gas phase (in upwards moving bubbles) into the aqueous mixture of sludge, due to the combined effects of increasing partial pressure and increasing solubility of $CO_2$ in water at lower temperatures. The dissolved $CO_2$ content of the incoming sludge is increased. The sludge is stagnant during most of the cycle, when valve is closed, but increases in temperature because of the heating in the first zone. This results in sludge that becomes saturated or even oversaturated in $CO_2$. The increase in pressure helps to keep the $CO_2$ dissolved in the sludge. However, when the release valve is opened at the end of the cycle, the pressure drops. This generates many new CO2 bubbles. This operation ensures a good interaction between the gas phase and the liquid sludge, and ensures that the sludge is saturated with $CO_2$ at the local temperature that applies.

The dissolved $CO_2$ lowers the pH of the sludge. The bulk of the $H^+$ ions coming from dissolved $CO_2$ are buffered by the phosphates and other salts that are typically present in the sludge. However, more and more $CO_2$ is dissolved, leading to a pH that is the result of the equilibrium that is established between the dissolved $CO_2$ and the gaseous $CO_2$ in the bubbles.

In the middle sections, with a total pressure of 20 bar, 5 bar partial pressure of $CO_2$ and 200° C., the pH is well above 5. At the inlet with 20 bar $CO_2$ and 40° C., the pH is 3.2. This means that there is a pH gradient, but the pH is at all times lowered with respect to the incoming sludge. Since the decomposition reactions of hydrothermal treatments, such as Torwash, are acid-catalysed, the efficacy of the reactor is improved with the design according to the invention. These reactions start at a temperature that is lower than the reaction temperature in the middle sections (34) and take place already before the operational temperature is reached, generating $CO_2$. At the operational temperature, acid-catalysis may no longer be needed, but the acidification due to dissolved $CO_2$ still leads to an increased reaction rate. As a result, the reactor can be much smaller, residence times shorter and/or operation temperature can be reduced.

The solubility of $CO_2$ and $H_2S$ is lowest at the highest temperature, i.e. the setpoint temperature in the second zone. Since $CO_2$ and $H_2S$ are continuously removed from the sludge that is being treated, by means of upwards flowing bubbles, and since the partial pressure of $CO_2$ and $H_2S$ is rather low (total pressure minus water vapour pressure), there is at the end of the isothermal section (bottom of the second zone) hardly any $CO_2$ and $H_2S$ left. The dissolved concentration is low. After cooling to 40° C. the liquid sludge is far from saturated with $CO_2$ and $H_2S$. In the release valve, no gas is formed, even when the pressure is lowered from 25 to 1 bar. The processed sludge discharged from the reactor contains very little $CO_2$ and $H_2S$. In the reactor, the sulphur-containing gases are effectively removed from the processed sludge before the sludge enters the last section and accumulate in the expansion vessel. The smell of the sludge processed according to the present invention is much better than sludge hydrothermally treated by conventional means, and much better than unprocessed sludge because it is sterilized and bacterial activity emitting $H_2S$ is absent. The gas released from the expansion vessel via outlet has a terribly smell. All sulphur-containing gases have accumulated in this small stream, which can be post-treated as known in the art.

The invention claimed is:

1. A hydrothermal reactor, comprising:
   an inlet for receiving an aqueous mixture, positioned at the top part of the reactor interior;
   a tube-shaped reactor interior, which is inclined at an angle in the range of 1-45°;
   a first zone in the reactor interior comprising a means for heating the aqueous mixture to a predetermined temperature;
   a second zone in the reactor interior for keeping the aqueous mixture at the predetermined temperature;
   a third zone in the reactor interior for cooling the aqueous mixture;
   an outlet for discharging a hydrothermally treated aqueous mixture, positioned at the bottom part of the reactor interior; and
   an outlet for discharging gas, positioned at the top part of the reactor interior.

2. The reactor according to claim 1, wherein the inclination angle of the reactor interior is in the range of 2-15°.

3. The reactor according to claim 1, further comprising an expansion vessel positioned at the top part of first zone, wherein the outlet is integrated in the expansion vessel.

4. The reactor according to claim 3, wherein the expansion vessel comprises a sensor for determining the liquid level within the expansion vessel.

5. The reactor according to claim 1, wherein the outlet comprises a valve which can be opened and closed during operation.

6. The reactor according to claim 1, wherein the reactor comprises a heat exchanger for heating the aqueous mixture in the first zone and for cooling the aqueous mixture in the third zone.

7. The reactor according to claim 1, wherein the reactor is capable at operating at a predetermined temperature in the range of 160-320° C. and a pressure in the range of 10-50 bar.

8. The reactor according to claim 7, wherein the reactor is capable at operating at a predetermined temperature in the range of 175-230° C. and a pressure in the range of 15-30 bar.

9. The reactor according to claim 1, which is contained in a hydrothermal treatment facility comprising:
   (1) a buffer tank for holding an aqueous mixture that is to be treated;
   (2) a pump for pumping an aqueous mixture from the buffer tank to a reactor;
   (3) the reactor according to claim 1; and
   (4) an expansion vessel positioned at the top part of the reactor, wherein the outlet is integrated in the expansion vessel.

10. The reactor according to claim 9, wherein the hydrothermal treatment facility further comprises a dewatering device for dewatering the liquid effluent discharged via outlet and a digester for digesting the aqueous mixture before it is subjected to the reactor or after it has been dewatered in the dewatering device.

11. A process for hydrothermally treating an aqueous mixture in the reactor according to claim 1, comprising:
   (a) feeding the aqueous mixture into the reactor interior via inlet,
   (b) allowing a downward flow of the aqueous mixture through the reactor interior, while heating the aqueous mixture to a predetermined temperature in the first zone, keeping the aqueous mixture at the predetermined temperature in the second zone, and cooling the aqueous mixture in the third zone, as such hydrothermally treating the aqueous mixture;
   (c) discharging a hydrothermally treated mixture via outlet,
   (d) discharging gas via outlet.

12. The process according to claim 11, wherein the aqueous mixture is watery biomass.

13. The process according to claim 12, wherein the aqueous mixture is selected from sludge, manure, dredging waste, food production waste and garden waste.

14. The process according to claim 13, wherein the aqueous mixture is sludge obtained from a wastewater treatment process.

15. The process according to claim 11, wherein the gas that is discharged via a gas outlet is further treated by a method for capture of $H_2S$ and other sulfurous compounds.

16. The process according to claim 11, wherein the reactor operates in cycles, each cycle comprising while continuously feeding the aqueous mixture during step (a):
   (1) a first stage wherein the outlet is closed, no hydrothermally treated mixture is discharged, and the pressure within the reactor increases from an initial pressure to a final pressure,
   (2) a second stage wherein the outlet is open, hydrothermally treated mixture is discharged, and the pressure within the reactor decreases from the final pressure to the initial pressure.

17. The process according to claim 16, wherein the first stage lasts 70-99% of the cycle duration and the second stage lasts the remaining cycle duration.

18. The process according to claim 16, wherein the cycle duration is in the range of 5 minutes-2 hours.

19. The process according to claim 16, wherein the initial pressure is in the range of 10-30 bar and the final pressure is in the range of 20-50 bar, wherein the initial pressure is higher than the final pressure.

20. The process according to claim 19, wherein the initial pressure is at least 5 bar higher than the final pressure.

* * * * *